Nov. 3, 1953

E. J. POITRAS 2,658,190

LIQUID-VAPOR PHASE DIFFERENTIAL FIRE AND
OVERHEAT DETECTOR AND CONTROL AND SYSTEM

Filed June 14, 1952

Inventor:
Edward J. Poitras

Inventor:
Edward J. Poitras,
by Emery, Booth, Townsend, Miller & Weidner
Attys

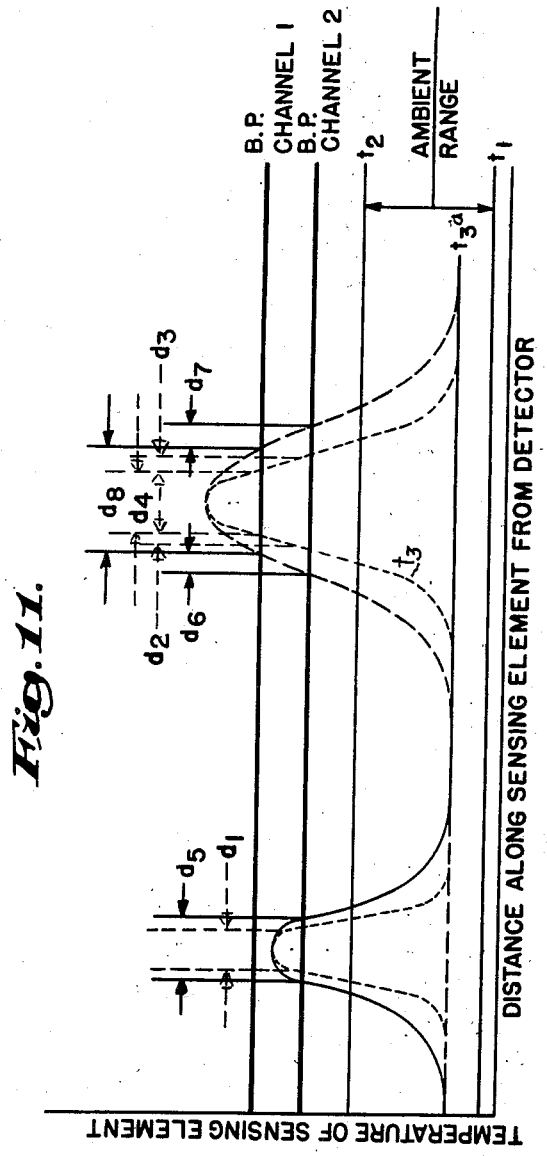

Patented Nov. 3, 1953

2,658,190

UNITED STATES PATENT OFFICE 2,658,190

LIQUID-VAPOR PHASE DIFFERENTIAL FIRE AND OVERHEAT DETECTOR AND CONTROL AND SYSTEM

Edward J. Poitras, Holliston, Mass.

Application June 14, 1952, Serial No. 293,691

18 Claims. (Cl. 340—229)

This invention relates to detecting fire and overheat, to controlling temperature, and to providing warning or other responsive action. It aims at providing a system and means of the continuous type, wherein detection is possible in a spatially continuous manner throughout the area concerned.

It is a general object of the invention to provide a highly sensitive means, free from the effect of any expectable changes in ambient temperature, for detecting abnormal temperature conditions including either overheating or actual fire, or for controlling the maximum temperature in a normally heated area. In accordance with the invention, the detector device and system are thus adapted for uses where there may be a wide range of normal operating temperatures as, for example, in the protection of, or for the control of temperature near power plants of aircraft.

Hence, an important feature of the invention is the elimination of the "averaging effect" which has heretofore been typical of continuous detector systems employing long sensing elements, such as tubing or wire, extending throughout the area to be protected or controlled. By "averaging effect" is meant the condition which makes it difficult to distinguish between a relatively small or normal temperature change over a long length of the sensing element, such as an expectable change in the ambient temperature, and a relatively large temperature change over a short length of the sensing element as characterized by localized overheating or fire. In devices subject to the "averaging effect," the minimum length of the sensing element that will respond to a critical or alarm temperature, and sometimes the alarm temperature itself, is a function of the ambient temperature, and reliability is accordingly impaired.

A typical continuous detection system that is subject to the "averaging effect" is a length of tubing connected to a bellows, both filled with a liquid selected to boil, and consequently increase in total volume, at a predictable temperature. Although a change from the liquid to the vapor state in even a short section of the tube is signalled by a deflection of the bellows, a signal of comparable magnitude may be caused by an increase in the ambient temperature surrounding a long section of the tube, and a consequent increase in the volume of the liquid in the tube by virtue of the liquid's coefficient of volumetric expansion.

This invention novelly makes use of plural-channel tubing with a like number of associated bellows functioning cooperatively to eliminate the "averaging effect." The two or more tubing channels or ducts are parallel and, in one form, are so thermally intimate that corresponding locations on them have identical temperatures under all conditions. Also the respective bellows are so related that only a difference in deflections constitutes a signal. The two liquids, for simplicity of illustration, have equal coefficients of volumetric expansion, but different boiling points. Since all changes in ambient temperature produce equal deflections in the two bellows, and since only a differential deflection can produce a signal, conditions necessary for a signal, that is, boiling in one tube without boiling in the other, are unrelated to ambient temperature.

Another feature of the invention is the independence of the critical or alarm temperature from any previous rate of change of temperature. Since the boiling points of the liquids, although different, are nevertheless fixed, the critical or alarm temperature is also fixed at the lower of the boiling points of the two liquids, in the exemplary dual case. Only when some portion of the parallel lengths of tubing is at a temperature above the boiling point of one liquid and below that of the other can the bellows deflect differentially and initiate a signal.

Another concern of the invention is that of alarm sensitivity, that is, the minimum unit of length of the sensing element which will respond to a critical or alarm temperature. In a continuous detection system which is subject to the "averaging effect," sensitivity at the low end of the ambient temperature range is limited to a length of the sensing element equal to the change in length of the liquid "column" inside the tube caused by the total expectable change in ambient temperature. A feature of this invention is the mutual independence of the sensitivity and the ambient range, the sensitivity being limited only by the minimum differential deflection of the bellows necessary to initiate an intelligible signal.

A numerical example illustrates the related problems of "averaging effect" and sensitivity which this invention eliminates. Assume that a 20 ft. length of tubing is filled with a liquid that has a volumetric expansion coefficient of $5 \times 10^{-4}$ per degree F., and is to be subjected to an ambient range of 300° F. If the linear displacement of liquid from the end of the tubing is denoted by S, for the total ambient change of temperature over the whole length of tubing, then $S = 20 \times 5 \times 10^{-4} \times 300$
$= 3$ ft.
$= 15\%$ of the length of the tubing.

Likewise, if a 3 ft. length of the tubing were subjected to a fire or overheating, so that the liquid boiled, S would again equal 3 ft. provided that the ambient temperature of the rest of the tube had remained constant. Since these two conditions would be indistinguishable to a signalling bellows at the end of the tube, an ambient temperature change of 300° over the whole tube could be interpreted as a 3 ft. fire or overheating over part of the tube, assuming the signalling bellows as being sensitive to a 3 ft. length. Hence, the "averaging effect" would have limited the sensitivity to a value that is unacceptable in many applications.

A further feature of the invention is that of repeatability. Whereas the means of some commonly used detection systems suffer changes, during an overheat or fire condition, that are not automatically reversible, and which therefore prevent the de-energizing of signalling circuits, the means and system of this invention provide that the beginning and the end of a fire or overheat condition are signalled with equal reliability, and further provide that any subsequent repetition of said condition will again be signalled.

In the drawings illustrating the invention:

Figs. 1 to 6 show schematically several operational conditions of an embodying system wherein:

Fig. 1 represents a normal or non-emergency status with the ambient temperature at or near the low level of the range;

Figure 2:
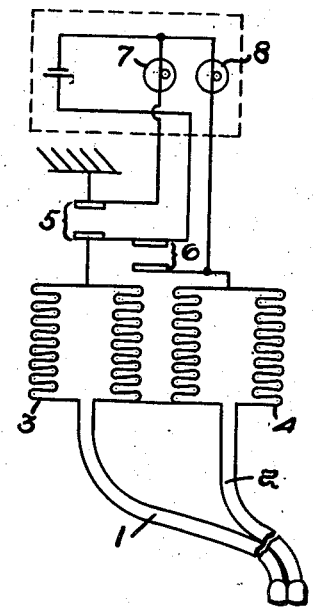
Figure 3:
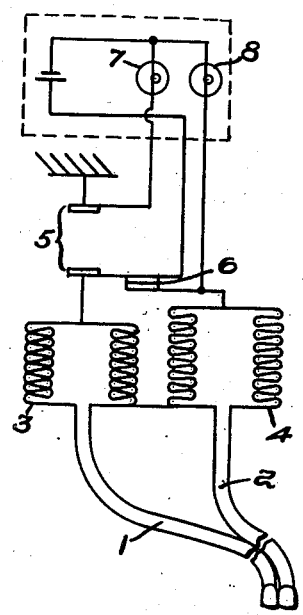
Figure 4:
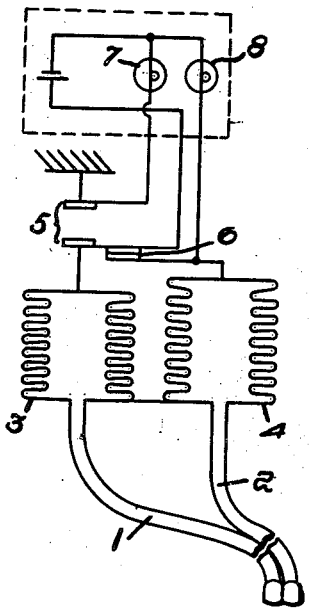
Figure 5:
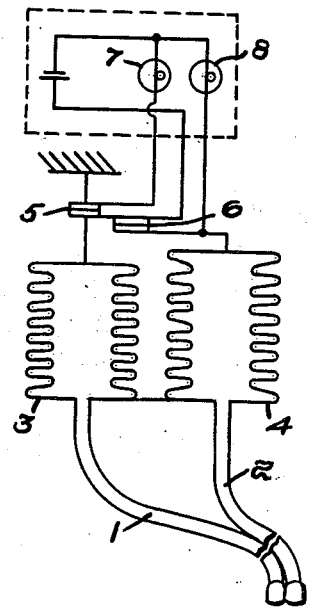
Figure 6:
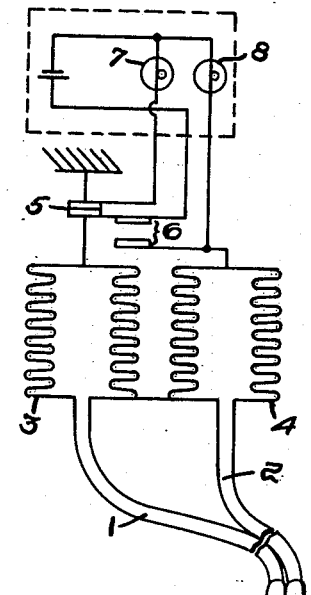
Figure 8:
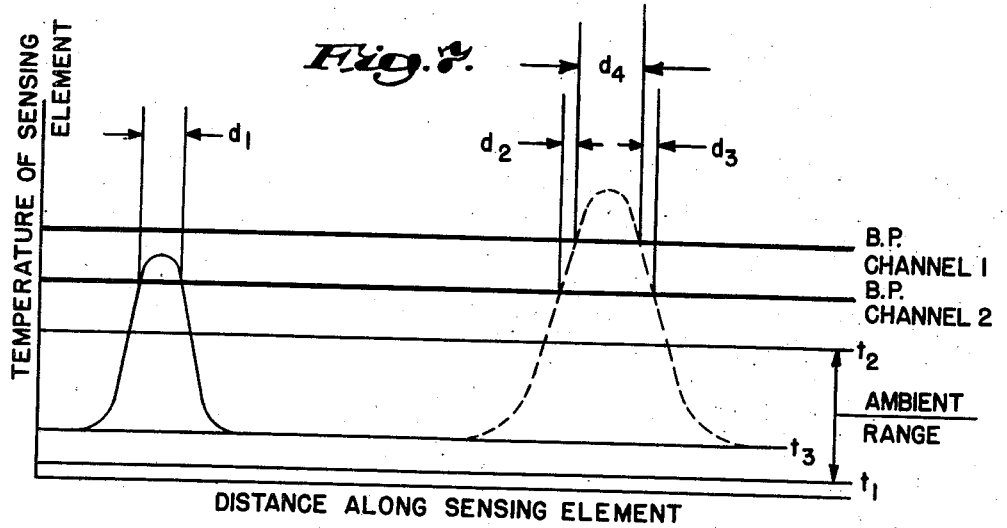
Figure 9:
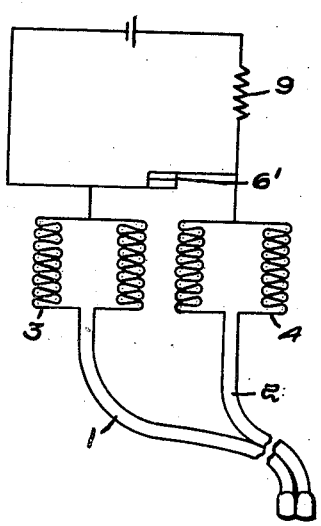
Figure 10:
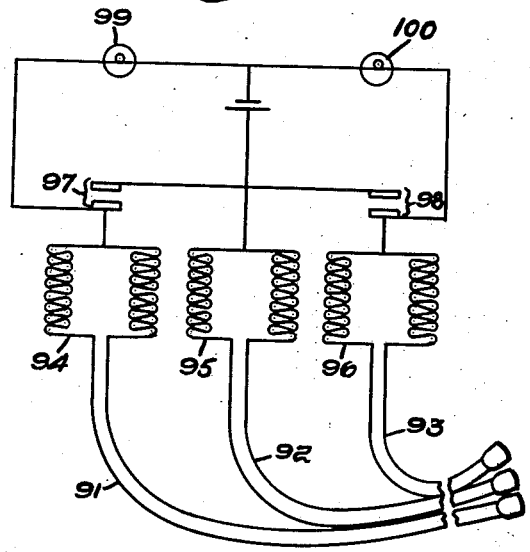
Figure 8:
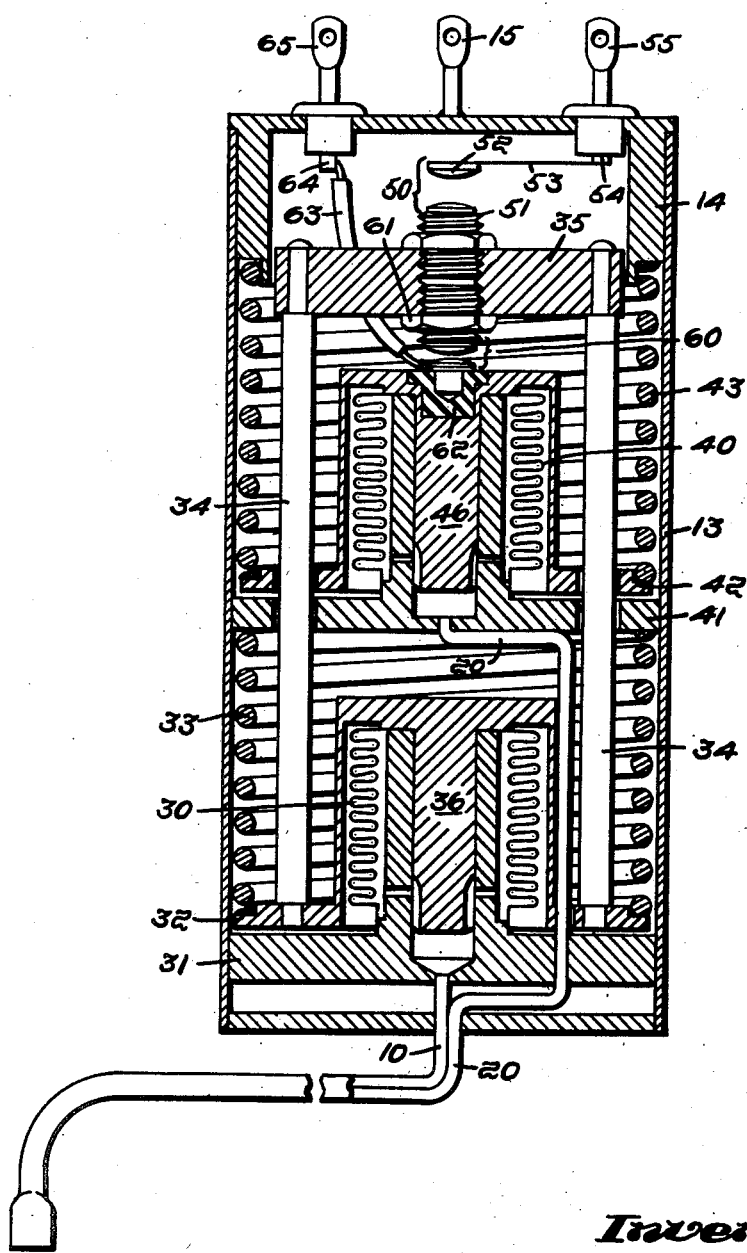

Fig. 2 indicates an approach to the high level of the ambient temperature range but without overheat or fire;

Fig. 3 portrays an emergency or alarm condition such as fire or overheat at some location on the sensing element, the remainder of which is at an intermediate level of the ambient temperature range;

Fig. 4 shows an emergency or alarm condition similar to that of Fig. 3 but wherein the fire or overheat has reached a higher temperature;

Fig. 5 likewise shows an emergency or alarm condition similar to that of Fig. 3, but wherein the fire or overheat envelops a greater length of the sensing element and may also have reached a higher temperature than in Fig. 3;

Fig. 6 represents a near emergency condition as with substantially the entire sensing element above the ambient temperature range with no portion having yet reached the fire or overheat alarm temperature;

Fig. 7 is a graphical representation of the liquid-vapor phase condition along the sensing element as a function of surrounding temperatures;

Fig. 8 is a sectional view of one structural embodiment of a differential detector unit such as schematically shown in Figs. 1 to 6;

Fig. 9 shows schematically an embodying system particularly adapted to the control of the maximum temperature in a heated area;

Fig. 10 is a schematic representation of a control or alarm system capable of signalling more than one control or alarm temperature from a given location on the sensing element; and Fig. 11 is a graphical representation corresponding to that of Fig. 7 but representing results where the thermal conductivity of metallic parts of the sensing element is increased.

Considering the manner of operation of the invention and referring first to Figs. 1 to 6 for convenient identification of the main elements of the system, the sensing element proper comprises a plurality of tubular channels 1 and 2 of a length to extend continuously about the area or zone to be subject to monitoring. The channels may be constituted as individual tubes or otherwise formed to afford in this example closely parallel but separated enclosed passages so that at any given point or along any minimum length unit the particular temperature condition there existing affects both channels equally. Conveniently there is employed for the purpose the appropriate equal lengths of capillary metal tubing, selected for the maximum temperature to be encountered and such as to be readily bent about and installed in the monitored area. The outer or free end of each channel member 1 and 2 is closed as indicated. At the other end the channels 1 and 2 are connected respectively to variable volume chambers 3 and 4 represented as flexible bellows.

The channels 1 and 2 and their respectively connected bellows 3 and 4 are completely filled with liquids selected and conditioned to have boiling points at temperatures corresponding to the maximum, abnormal, or emergency temperature conditions to be controlled or detected, and further such that the liquid of one channel, for example channel 1, has a higher boiling point than that for the liquid of the other channel, herein channel 2 and its connected bellows 4. This operational requirement may be had by use of the same liquid in both channel and bellows units 1, 3 and 2, 4 and by relatively pressure-conditioning the two channels with respect to atmospheric pressure, to afford the desired differential in the respective boiling points. This may be done, for example, by spring loading bellows 3. Or different liquids may be employed in the respective channels and bellows, liquids inherently differentiated as to their boiling points. Further, the channels, bellows and liquid content are arranged and selected so that the separated liquids either have equal volumetric coefficients of expansion or else the cross-sectional areas of the bellows and the tubing are relatively proportioned to compensate automatically for any inequality of the coefficients of volumetric expansion of the two liquids.

Electrical circuits associated with the bellows are opened or closed according to the several operational phases. As schematically shown in Figs. 1 to 6 there is provided a pair of contacts 5 one of which is mounted to move with the bellows 3 and the other of which has fixed support. Another pair of contacts 6 is mounted so that one of them moves with the first bellows 3 and the other of them moves with the other bellows 4. It will be understood that bellows 3 and 4 need not necessarily be disposed to provide parallel motion in the same direction or to activate the contact pairs 5 and 6 directly. Under some conditions it may be desirable that bellows 3 and 4 drive contact pairs 5 and 6 through ratio and direction changing means, such as linkages or gears, to compensate for dissimilar bellows dispositions, cross-sectional areas of bellows and channels, and volumetric coefficients of expansions of liquids. The contact pairs 5 and 6 are disposed in separate circuits supplied from a cell or other power source as indicated, so that each effects a distinctive operation or indication, such as a visual or other signal, shown in Figs. 1 to 6 as lamps 7 and 8 respectively. Such signal means, if visual, are differentiated in color, positionally, or otherwise, or any preferred distinctive signal may be employed. For example, the illustrated lamp 7 may be red and the lamp 8 yellow. It will also be understood that the contacts, while illustrated as normally open, may be in reverse or normally closed circuit arrangements.

Figure 1:
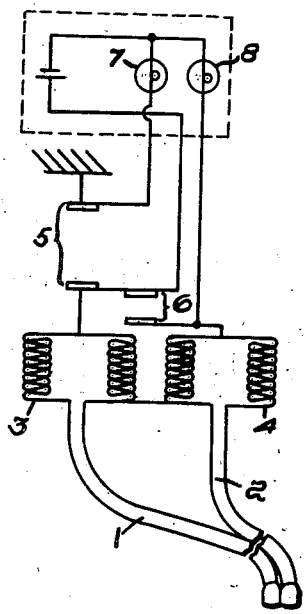

With the thermal detecting system and means of the invention constructed and arranged as illustrated and described, it is evident that since both sensing channels 1 and 2 and the corresponding chambers 3 and 4 have the same volumetric expansion characteristics the bellows action is identical and parallel so long as the temperature conditions along the whole sensing element remain below the boiling point of the lower-boiling liquid. Below said lower-boiling level, temperature changes, whether local or general over the entire system, produce parallel expansion or contraction of the two bellows 3 and 4. The contacts 6 accordingly remain open, rising or falling in parallelism. This is apparent from a comparison of Figs. 1 and 2 representing situations respectively at or near the lower and the upper levels of the ambient range. At such times the contacts 5 also remain open, the fixedly mounted or upper contact of the pair 5 on the diagram being spaced from the maximum or upper position of the movable contact of the pair 5 when the latter is at the top of the safe and expectable ambient range.

In further considering the manner of operation of the invention and referring again to the digit-numbered parts in Figs. 1 to 6, when the detection channels 1 and 2 of the sensing element are heated or cooled, at any level below the boiling point of the lower boiling channel, herein channel 2, the contained liquids change volume by the same amount. Consequently the two bellows 3 and 4 move to the same extent and in the same direction.

As represented in Fig. 1 the operating conditions are normal and the ambient temperature is at or near the lower level of the range. The bellows 3 and 4 accordingly are in substantially the maximum contracted positions, each at the same relatively low level. Both contact pairs 5 and 6 are open and the corresponding lamps 7 and 8 accordingly are both out.

Fig. 2 again represents a non-alarming or non-emergency operating condition but wherein the ambient temperature about the sensing element 1, 2 has risen to somewhere near the upper level of the safe and expectable ambient range. The liquid contents of the channels 1 and 2 accordingly have expanded equally, and the two bellows 3 and 4 consequently have distended, also equally, and in parallelism. The two contacts of the pair 6 have each risen substantially from the low ambient level of Fig. 1 but since the travel of both has been the same the contacts 6 remain open. Also, the contacts 5 remain open, although closer to each other, and the spacing and adjustment are such that no contact closure can occur within the safe or expectable ambient range for the particular equipment or installation concerned.

Coming now to Fig. 3 it should be noted first that the assumed general ambient temperature about the sensing element 1, 2 is not as high as in Fig. 2, as evident from the lower or less distended condition of both bellows 3 and 4. Assume now that some part of the sensing element has become heated to at least as high a temperature as the boiling point of the lower-boiling liquid, namely that of channel 2 and bellows 4. The attendant change of the liquid into vapor increases the volume of the contents of channel 2 and necessarily forces some liquid into bellows 4, causing it to distend differentially with respect to bellows 3. Under the conditions illustrated no boiling has occurred in channel 1 since nowhere along the sensing element has the temperature reached the boiling temperature of the liquid of that channel. Thus Fig. 3 represents a localized heating to a temperature in the differential range between the two boiling points of a sufficient length of the sensing element to distend the bellows 4 differentially beyond bellows 3 so as to close the contacts 6 and effect an alarm signal, as by lighting the lamp 8.

The described conditions with reference to Figs. 1, 2 and 3 will further be apparent with reference to the graph of Fig. 7 in which the vertical axis represents temperature and the horizontal axis represents distance along the sensing element. On Fig. 7, the horizontal lines $t_1$ and $t_2$ indicate the bottom and the top levels of the ambient temperature range. Any temperature condition remaining wholly within the ambient range between the temperature levels $t_1$ and $t_2$, whether relatively low as in Fig. 1 or relatively high as in Fig. 2, produces no signalling action.

On Fig. 7 the solid-line temperature-distance curve $t_3$ including the minor peak at the left indicates a condition such as in Fig. 3. That is, over a length $d_1$ of the sensing element the lower-boiling liquid of channel 2 has exceeded its boiling point indicated by the first horizontal line above the line $t_2$, marked "BP-channel 2." It is noted that the heating at the affected part of the sensing element has not attained the boiling point temperature of the higher-boiling liquid indicated by the top line of Fig. 7, marked "BP-channel 1." Hence there is no corresponding displacement of liquid in channel 1. Consequently, bellows 4 distends without a corresponding distention of bellows 3. $d_1$ on Fig. 7 represents the length of the liquid column displaced from channel 2 by reason of the phase change to vapor therein. If $d_1$ is large enough, in other words, at length in the system, as is assumed for Fig. 3, contacts 6 close and the alarm is given as by lighting of the lamp 8.

Referring to Fig. 4 and also Fig. 7, again assume the relatively low or intermediate ambient condition as indicated for Fig. 3, within the range $t_1$ and $t_2$ of Fig. 7. Suppose now that some part of the sensing element is heated to a temperature exceeding the higher boiling point for the liquid of channel 1. Such a condition is illustrated by the dash-line curve $t_3$ including the higher and wider peak at the right in Fig. 7. Now, the temperature exceeds the boiling temperature in both channels and the liquid-vapor phase change causes substantial displacement of liquid from each of them. That displaced from the higher-boiling channel 1 is represented by the length $d_4$ on the graph but the liquid displacement from the lower-boiling point channel 2 comprises $d_4$ plus the further amounts $d_2$ and $d_3$. Thus again there is a differential action, bellows 4 distending more than bellows 3. The contacts 6 accordingly close and cause a signal at the lamp 8.

If, in this last described situation, the length of the sensing element subjected to the overheat or fire condition is increased, the displacement $d_4$ of liquid from channel 1 may become great enough to distend bellows 3 sufficiently to close the contact pair 5 and thereby light alarm lamp 7 in addition to lamp 8. Such a condition is illustrated by Fig. 5. The remaining differential action equal to $d_2$ and $d_3$, added to the enlarged $d_4$, correspondingly distends the bellows 4, and the first-lighted lamp 8 remains lighted. Such combined signalling by lighting of lamps 8 and 7, in that order, therefore indicates a significant enlargement of the overheat or fire condition.

Considering now another condition, referring more particularly to Figs. 6 and 7, let us start again with a general temperature condition somewhere within the ambient range, whether low or high in that range. Assume now that substantially the entire length of the sensing element is heated to and somewhat beyond the maximum ambient temperature $t_2$. The following response sequence takes place: first, and just as the temperature passes the top ambient limit at the level $t_2$ the volumetric expansion of the liquid in channel 1, even without change of phase, distends the bellows 3 sufficiently to close its corresponding contacts 5 and to signal by lighting the lamp 7. This occurs without heating either liquid to the boiling point. Hence there is no differential action, both bellows distending in parallel and the contacts 6 remaining open. Thus the lighting of the lamp 7 first, and alone, indicates that the ambient range has been generally exceeded but that no part of the sensing element is yet up to a critical alarm temperature, i. e., the boiling point for the lower-boiling channel 2.

If now in the last described situation, and referring back to Fig. 5, the temperature of the whole sensing element, or any part of it, does rise still further, such that the boiling point for the liquid of channel 2 is reached and passed, then a liquid displacement such as $d_1$ at the left in Fig. 7 acts differentially to cause contacts 6 to close and to light lamp 8 in addition to lamp 7, in the order 7 and then 8. This sequence of signal or lamp behaviour indicates increasing intensity of the fire or overheat condition. It also indicates, historically, that the emergency commenced in a general ambient overheat rather than in a more localized overheat or fire.

It will be appreciated that for various operational conditions, such as those encountered in aircraft, interpretation of the described behaviour of the signals or lamps may be difficult or impractical. However, in accordance with the invention, any information had from the action of the contacts 5 and 6 and the relative timing and sequence thereof may readily be integrated by appropriate electrical or electronic circuits to give an immediately intelligible indication of the temperature conditions at any time including not only the occurrence but the extent of the fire or overheat and also the history of its development, that is, whether from an initially relatively localized source or from a more general and extensive overheat origin.

Although each of the foregoing operational descriptions culminates in the signalling of an overheat or alarm condition, the system and means of the invention are equally useful for control purposes. Fig. 9 shows schematically an arrangement similar to that in Figs. 1 to 6 except that contacts 5 have been omitted and contacts 6' redisposed so as to remain closed at all sensing element temperatures below the boiling point of the liquid in channel 2, the liquid, that is, with the lower boiling point of the two. Contacts 6' open only when some part of the sensing element is heated to this boiling point. If, furthermore, the heat supplied to the sensing element by heating agent 9 throughout the area being temperature controlled is arranged to be dependent on the electrically closed condition of contacts 6', a situation will prevail where the hottest portion of the sensing element will automatically be maintained at or limited to the boiling point of the liquid in channel 2. The remainder of the sensing element will either, by necessity, be limited to the same temperature or remain uncontrolled below it, depending on the uniformity of the heating agents and the heat losses over the area being controlled.

So arranged, the invention is applicable, for example, to the control and consequent protection of such devices as heater manifolds where the temperature throughout must be the maximum possible without at any point exceeding a predetermined safe value.

Fig. 8 illustrates one simple structural form of a sensing or detector unit representative of actual practice of the invention. There the main elements are identified by similar numerals as in Figs. 1 to 6 with the addition of a cipher. The two separate but similarly volumetrically expansive matched or compensated liquid-filled channels 10 and 20 of the sensing element, closed at the outer ends, are in closed communication, respectively, with the interior of duplicate bellows 30 and 40 disposed in tandem. The lower end of the bellows 30 is closed and supported by a stationary wall 31 and the other bellows 40 is similarly closed and supported by a fixed wall 41. These supporting cross walls 31 and 41 are held in fixed spaced relation in and by a cylindrical or other shell or housing 13 defining a protective container for the unit.

The first or lower bellows 30, associated with channel 10 herein having the liquid with the higher boiling point, is sealed at the upper end to a movable inverted cup-like plate 32 having a lateral flange on which is seated a coil spring 33 bearing between the flange and the under face of the intermediate fixed wall 41. The other or upper bellows 40, associated with the channel 20 herein having the liquid of lower boiling point, is similarly provided with and sealed at its upper end to a movable inverted cup-like plate 42 seating a coil spring 43 bearing at the upper end against a top fixed wall member 14.

The movable plate 32 of the bellows 30 also carries a plurality of symmetrically disposed posts 34 extending through aligned apertures in the intermediate fixed wall 41 and in the movable plate 42 of the bellows 40. At the upper ends the posts 34 have fixed on them a cross piece 35 which serves as a movable carrier for one of the contacts of the pair 50 and also one contact of the pair 60. These contacts on the movable carrier 35 desirably are individually adjustable as by forming them as threaded pins 51 and 61 tapped into and adjustably projecting at the opposite faces of the carrier 35. The other contact of the movable pair 60 is shown as a metal button 62 on and insulated from the movable cover plate 42 of the bellows 40 and connected by a lead 63 to an insulated terminal post 64 on the top wall 14 of the shell. The second contact of the pair 50 is provided by a button 52 on a conductive spring leaf or arm 53 secured at the outer end to another insulated terminal post 54 on the top wall 14. The contacts 51, 61 which move with the bellows 30 containing the higher-boiling liquid are illustrated as grounded to the frame or housing 13, the latter being provided with a connection terminal 15 common to both contact circuits.

Access for the liquid-filled channels 10 and 20 of the sensing element to the interiors of the respective bellows 30 and 40 is provided through the corresponding fixed bottom walls 31 and 41. Expanding and contracting movement of the bellows and of their movable cover plates 32 and 42 is guided as by piston-like guides 36, 46 axially fixed on the corresponding movable plates 32 and 42 and slidably received in corresponding wells in the fixed plates 31 and 41.

It will be understood that the bellows 30 and 40 are pressurized by the corresponding springs 33 and 43. Where the same liquid is employed for both sensing channels, and the bellows are identical, the spring 33 is selected and adjusted to exert a greater force than the spring 43, thereby causing the liquid of channel 10 and bellows 30 to have a higher characteristic boiling point and alarm-level than the same liquid in channel 20 and bellows 40. As indicated earlier, a similar differential as to boiling point may be had otherwise, as by selecting liquids differing in that respect, with any necessary adjustment, such as between the cross-sectional areas of the two bellows, to compensate for unequal volumetric expansions of the liquids of the two channels and bellows in the range below the lower boiling point level. Further adjustment of response, as appropriate to the particular operational conditions, may be had through adjustment of the movable contact 51 of the pair 50 and of at least one of the movable contacts such as 61 of the pair 60. It should also be noted that the fixed but yieldable mounting of the normally stationary contact 52 of the pair 50, which mount is also assumed for the diagrammatic Figs. 1 to 6, takes care of any extreme conditions of expansion of bellows 3 and 4.

For maximum performance, it is desirable that each variable volume chamber, such as 3, 4 of Figs. 1 to 6 or 30, 40 of Fig. 8, have a capacity enabling it to accept the entire liquid content of its channel. This may be accomplished by proportioning the bellows itself so to accommodate all the liquid of its sensing channel, or the requisite capacity may be afforded by providing, in communication with the bellows, overflow and feed-back reservoirs.

While the foregoing description has been concerned with an embodiment of the invention employing a dual system of channels and corresponding bellows, it should be understood that in some operations and processes, it is desirable to have three or more channels in the sensing element, each connected to a bellows, and each containing a liquid with distinctive thermal characteristics. The advantage of such a system stems from its ability to control or signal an alarm as a function of two different overheat or alarm temperatures occurring successively at a single location on the sensing element.

With reference to Fig. 10, channels 91 to 93 are connected respectively to bellows 94 to 96 and filled with liquids selected and conditioned so that the contents of each channel boils at a distinctive temperature determined by the control or alarm requirements. For example, the liquids in channels 91 and 93 boil respectively at lower and higher temperatures than the liquid in channel 92. As explained for Figs. 1 to 6, at all temperatures below the lowest boiling point, the three bellows maintain equal distensions. When the boiling point in channel 91 is reached, contacts 97 close, lighting lamp 99; when the boiling point in channel 93 is reached, contacts 98 close, lighting lamp 100. The same advantages with respect to high sensitivity, absence of averaging effect, and absence of rate of rise characteristics pertain to this and to other multi-channel systems and means of the invention as pertain to those illustrated in Figs. 1 to 6, and for the same reasons.

A practical embodiment of the schematic arrangement shown in Fig. 10, with parts disposed similarly to those in Fig. 8, for example, is useful in providing a warning signal ahead of an alarm signal in the event that any portion of the sensing element is subjected to an increasingly abnormal or emergency temperature condition. A modification of the contacts 97, 98 such that they are normally closed, as in Fig. 9, makes it possible, as an example, to use this arrangement as a modulating control device, one, that is, which reduces in steps the rate of heating applied to the area being controlled for maximum temperature.

The system and means of the invention are particularly useful in association with operations and processes where a large area must be monitored or controlled, and also in which the expectable range of ambient temperature is considerable. It will also be apparent from the foregoing description, in connection with the drawings, that the system and means of the invention are functionally independent of rate of change of temperature conditions within the ambient range.

Further in accordance with the invention, for a given overheat condition, the differential motions obtainable at the signal or control means, at the contacts of the illustrated examples, may be augmented and materially accentuated by providing relatively differing thermal conductance capacity for the two or more individual channel-enclosing members of the sensing element. This may be variously accomplished, as through selection of tubing or wall-forming structure and/or materials for the individual channels, and by restricting conductive thermal transfer between channels, or otherwise constructing the sensing element so that different thermal conductive capacity is had with respect to the channels having the lower and the higher boiling liquids.

Such accentuation of differential action through deliberate modification of the thermal conductance capacity for a given channel-defining member may be variously obtained. For example, the bounding or wall-defining materials for the channels may be selected as having inherently different coefficients of thermal conductivity, that for one channel being relatively highly conductive thermally and that for another channel being of relatively low thermal conductivity characteristics. Or the accented differential action may be had through use of more or less of the bounding or wall material for the respective channels, as by making the wall of one channeled or tubing member thicker than that for another of the channeled members so that one has greater total thermal conductance capacity than the other. In the latter instance the materials themselves may be the same or they may differ as to coefficient of thermal conductivity. Thus to suit particular use requirements the two factors of inherent conductivity of the material and of thickness or quantity of the material may be adjusted to afford the optimum conductance capacity for a given channel and the degree of accentuated responsive differential between channels as may be desired. Still further by way of example, one or more channels of the sensing element may have thermal conductance modifying longitudinal formations such as inserts.

In connection with any of the foregoing examples it will be understood that the main factor concerned is the total thermal conductance capacity for the given channel member. It comprises such capacity contributed by any or all of the mentioned structural expedients including that contributed by any longitudinal inserts or equivalent thermal conductance modificational formations.

Also it will be appreciated that for maximum differential effect at the contacts or other detector or control means, the channel member with the greater heat conductance capacity carries the liquid having the lower boiling point, while the channel or channels having lesser thermal conductance capacity carry the higher boiling point liquid or liquids. Thus in general the channel with the lower boiling point liquid is bounded or defined by the material of relatively high inherent thermal conductivity, or has the thicker wall formation, or has the longitudinal insert or other thermal conductance increasing modificational formation; and conversely for the channel or channels with the higher boiling point liquid or liquids.

It is here further noted that accentuated diffential action is aided by a construction and arrangement of the system so that opportunity for conductive thermal transfer between channel members is reduced or minimized, as by more or less separate formation and disposition of the channel members or tubing such as 1 and 2 as contrasted with an integral formation therefor or one in which the channels are intimately bonded together. Such restriction of heat transfer between channels may be aided by spacing them or by interposing thermal insulating material.

The manner of operation and resultant effects in system incorporating such thermal conductance differential as between the individual channels will be apparent with reference to the graphical representation of Fig. 11. In the previous examples the temperature at any point on the sensing element was arbitrarily assumed to correspond closely with that of the immediate environment. In other words, there was assumed a negligible longitudinal thermal conduction in the containing walls and content of channels 1 and 2 in connection with the curves shown in Fig. 7. In Fig. 11 the temperature distribution is represented for an embodiment wherein the walls of the channels such as 1 and 2 are of differentiated capacity as to thermal conductance, that for channel 2 with the lower boiling point liquid having the distinctly greater thermal conductance capacity.

It is assumed that the same environmental temperature conditions prevail in Fig. 11 as in Fig. 7, and that the thermal conduction characteristics of channel 1 are the same in Figs. 7 and 11. That is, the overheat conditions responsible for raising the temperature of the sensing element to curve $t_3$ of Fig. 7 and curve $t_{3a}$ of Fig. 11 are identical, both spatially and with respect to temperature. On Fig. 11 the curve $t_3$ of Fig. 7 is repeated in short-dash line for convenient comparison.

The effects of these identical overheat conditions on the temperatures of sensing elements having different thermal conductances are modified from those of Fig. 7 because of the more rapid diffusion of heat along the element having the higher conductivity. This higher rate of heat diffusion in effect broadens the peaks of curve $t_{3a}$ of Fig. 11 as compared with curve $t_3$ of Fig. 7. Consequently the differential motion of the bellows is increased. This is illustrated by the increase in lengths of $d_1$, $d_2$ and $d_3$ of Fig. 7 to the greater length $d_5$, $d_6$ and $d_7$ respectively of Fig. 11. Thus, considering the curves $t_3$ and $t_{3a}$ of both Figs. 7 and 11, the increase of differential motion for the Fig. 11 system as contrasted with that of Fig. 7 is represented by $d_5$ minus $d_1$ as to an operational condition as at the left in said figures, and is represented by $d_6$ plus $d_7$ plus $d_8$ minus the sum of $d_2$ plus $d_3$ plus $d_4$ as to an operational condition as at the right in said figures.

My invention is not limited to the particular embodiments thereof illustrated and described herein, and I set forth its scope in my following claims.

I claim:

1. For overheat and fire detection and temperature control, a plurality of pressure-tight chambers of variable volume in closed communication respectively with closely parallel enclosed channels defining a continuous temperature sensing element, filling quantities of liquids in the channels and chambers differentiated as to boiling point, and a circuit and contact means operatively related to the chambers to effect an operation only under differential chamber distention attendant on heating of some portion of the sensing element above the boiling point of a lower-boiling liquid.

2. For overheat and fire detection and temperature control, a plurality of pressure-tight variable-volume chambers respectively in closed communication with closely parallel enclosed channels defining a continuous temperature sensing element, filling quantities of liquid in the channels and chambers differentiated as to boiling points therein, a circuit and contact means operatively related to the chambers to effect an operation only under differential chamber distention attendant on heating of some portion of the sensing element above the boiling point of the lower-boiling liquid, and a second circuit and contact means controlled by the chamber having the liquid of higher-boiling point, for operative response to heating of a significant part of the sensing element to a temperature above the higher-boiling point.

3. For overheat and fire detection and temperature control, means according to claim 2 wherein the circuits and contact means are constructed and arranged for operation in a given sequence upon localized heating of the sensing element to above the higher-boiling level followed by an increasing of the affected length of the sensing element.

4. For overheat and fire detection and temperature control, means according to claim 2 wherein the circuits and contact means are constructed and arranged so that upon heating of substantially the entire sensing element beyond the expected ambient range but with no part thereof at alarm temperature of the lower-boiling level the operation controlled by the chamber having the higher-boiling liquid, and only that operation, is effected.

5. For overheat and fire detection and temperature control, means according to claim 4 wherein upon further temperature rise of any part or all of the sensing element to a level above the lower-boiling point both operations become simultaneously effected.

6. For overheat and fire detection and temperature control, means according to claim 2 wherein the circuits and contact means are constructed and arranged for continuation of the higher-boiling operation and inactivation of the lower-boiling operation upon cancellation of expansion differential between the chambers by heating of substantially the entire sensing element to a temperature above the higher-boiling level.

7. For overheat and fire detection, and for temperature control, a continuous elongate sensing element comprising two closely parallel separated tubular channels each closed at one end, two chambers of variable volume respectively in closed communication with the other ends of the channels, filling quantities of liquid in the respective channels and chambers having the same effective volumetric expansion properties with respect to the chambers but differentiated as to boiling points as pressure-conditioned in the channels and chambers, said chambers constructed and arranged for substantially identical expansion and contraction under expectable ambient temperature changes below the boiling level as consistent with normal operating conditions, and a pair of cooperable contacts movably carried one on one chamber and the other on the other so connected in a response circuit that upon subjection of a minimum unit part of the sensing element to above-boiling temperatures for the lower-boiling liquid change thereof to the vapor phase effects a contact-operating operation-effecting differential distention of the chambers.

8. For overheat and fire detection, multiple pressure-tight elastic chambers respectively in closed communication with closely parallel enclosed channels defining a continuous temperature sensing element, filling quantities of liquids in the channels and chambers differentiated as to boiling points therein, and signalling circuits including pairs of cooperable contacts operable by the respective chambers to effect signals only under differential distention of the chambers attendant on heating of some portion of the sensing element above the boiling point of one or more of the liquids.

9. For control of temperature, multiple pressure-tight bellows each in closed communication with one of a like number of closely parallel enclosed channels defining a continuous temperature sensing element, filling quantities of liquids in the channels and bellows differentiated as to boiling points therein, and control-circuits including pairs of cooperable contacts individually movable with the respective chambers to effect a change in temperature control current only under differential chamber distension attendant on heating of some portion of the sensing element above the boiling point of one or more of the liquids.

10. For overheat and fire detection, means according to claim 8 including an additional signal circuit and contact pair controlled by the chamber having the liquid of the highest boiling point, for signalling response to heating of a significant part of the sensing element to a temperature above said boiling point.

11. Means for overheat and fire detection and for temperature control according to claim 1 wherein the channels significantly differ in thermal conductance capacity.

12. Means for overheat and fire detection and for temperature control according to claim 1 wherein the channels significantly differ in thermal conductance capacity and are disposed in restricted conductive heat transfer relation to each other.

13. Means for overheat and fire detection and for temperature control according to claim 1 wherein the channels significantly differ in thermal conductance capacity and a channel with higher thermal conductance capacity contains a liquid with lower boiling point than that of a channel with lower thermal conductance capacity.

14. Means for overheat and fire detection and for temperature control according to claim 13 wherein the channels are of materials having different coefficients of thermal conductivity.

15. Means for overheat and fire detection and for temperature control according to claim 13 wherein the channels are differentiated as to thickness of the bounding material.

16. Means for overheat and fire detection and for temperature control according to claim 13 wherein a channel has a longitudinally extensive formation increasing the total thermal conductance capacity thereof.

17. Means for overheat and fire detection and for temperature control according to claim 1 wherein the variable-volume chambers are bellows disposed in file in a shell supporting one end of each bellows and also mounting spring means opposing bellows distension.

18. Means for overheat and fire detection and for temperature control according to claim 17 in which a contact carrying member is movably presented in opposition to the movable end wall of one bellows and is connected with the movable end wall of another bellows for movement therewtih.

EDWARD J. POITRAS.

References Cited in the file of this patent
UNITED STATES PATENTS

| Number | Name | Date |
|---|---|---|
| 1,986,479 | Lowe | Jan. 1, 1935 |
| 2,493,351 | Jones | Jan. 3, 1950 |